INVENTORS
Gary A. Cannalte
Ronald H. Chapman
BY

Attys.

INVENTORS
Gary A. Cannalte
Ronald H. Chapman
Attys.

March 29, 1966  G. A. CANNALTE ETAL  3,243,677
MOTOR CONTROL CIRCUIT
Filed Feb. 18, 1963  3 Sheets-Sheet 3
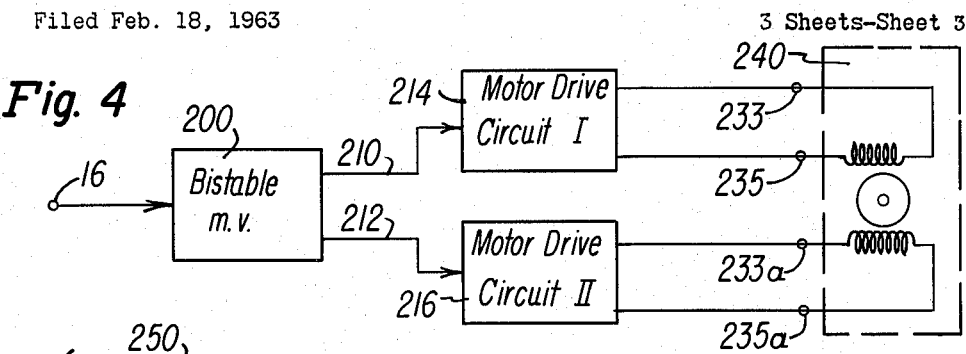
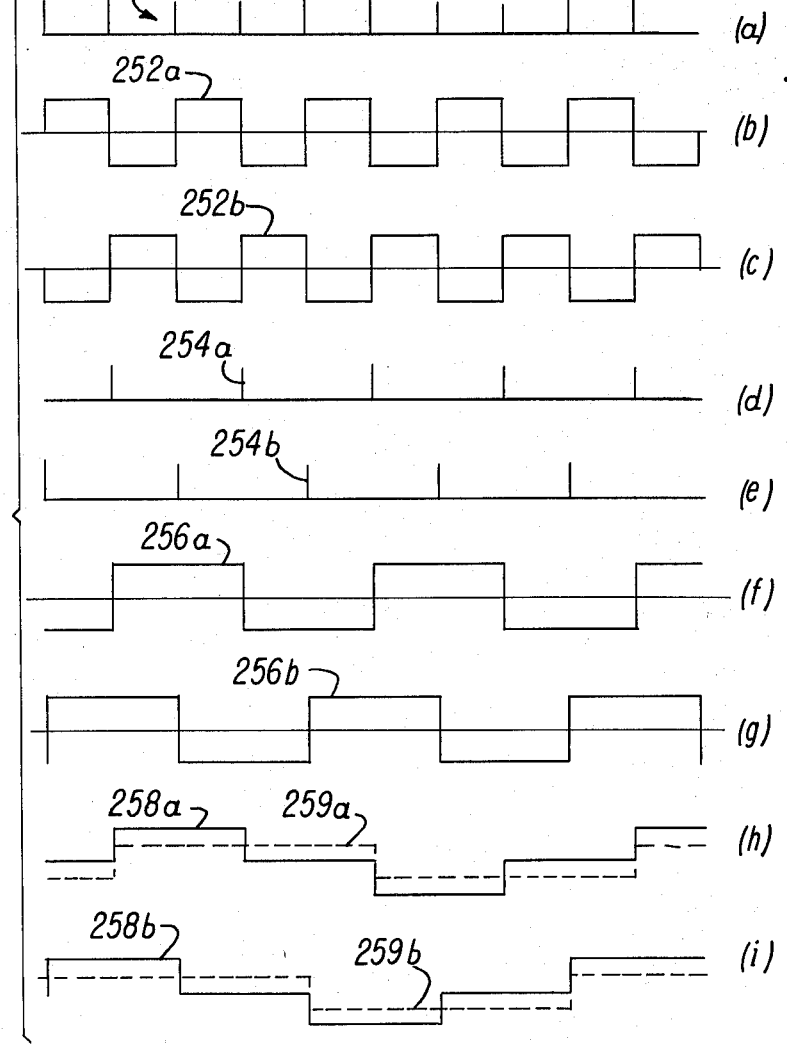
INVENTORS
Gary A. Cannalte
BY Ronald H. Chapman
Mueller & Aichele
Attys.

United States Patent Office 3,243,677
Patented Mar. 29, 1966

3,243,677
MOTOR CONTROL CIRCUIT
Gary A. Cannalte, Chicago, and Ronald H. Chapman, Wheaton, Ill., assignors to Motorola, Inc., Chicago, Ill., a corporation of Illinois
Filed Feb. 18, 1963, Ser. No. 258,990
14 Claims. (Cl. 318—138)

This invention relates to control systems and in particular to a motor control system for variable speed synchronous motors.

There are many applications where it is desirable to change the speed of electric motors by changing some characteristic of the energization voltage applied to them. It is well known, for example, that the speed of a synchronous motor may be changed by changing the frequency of its energizing voltage. However, the inductive reactance of the motor varies in proportion with frequency so that with a constant supply voltage amplitude the motor tends to draw more current with a decrease in frequency, and accordingly provision must be made to maintain the average current supplied to the motor constant over a range of frequencies if constant torque is to be maintained.

In present day electronic systems where variable speed motor drive is used, it is often convenient to operate synchronous motors from D.C. power supplies. Many applications further require that the associated circuitry be compact and lightweight so that the system may be readily adapted to portable or mobile operation. An example of such use is in vehicular and aircraft communications networks wherein received messages are automatically printed by a high speed printer at some point remote from a transmitting station. For system versatility and operator convenience it is desirable that several printing rates be provided, and accordingly it is necessary to provide a drive mechanism for the printer which can be varied in speed over a relatively wide range. In addition, other examples of apparatus requiring variable speed motor drive should be readily apparent to those skilled in the art.

In such instances the motor is driven by triggered switching circuits, with speed control accomplished by changing the repetition rate of triggering pulses applied to the system. In known prior art systems of this type, pulses of a constant duty cycle are applied to the motor, notwithstanding a change in pulse repetition rate. Thus, as the pulse repetition rate is changed, pulse amplitude must be varied and/or power dissipated so that constant average motor current can be maintained. This results in inefficient and complex power supply circuitry. It is therefore desirable to provide a system wherein constant average current may be drawn by the motor from a fixed D.C. supply over wide switching frequency ranges so that a simple unregulated D.C. supply can be used and the inefficiency associated with variable voltage supplies eliminated. It is further advantageous that in such systems means be provided to couple D.C. current pulses of alternating polarity to the motor over a wide frequency range without the use of large, heavy, frequency and waveform sensitive components such as transformers and other magnetic coupling devices.

Accordingly, it is an object of the invention to provide an improved control system for variable speed synchronous motor drive.

Another object is to provide a speed control system for synchronous motors which maintains the average current drawn by the motor from a fixed D.C. supply constant over a wide frequency range.

A further object of the invention is to provide a variable frequency synchronous motor speed control system wherein the motor pull-out torque at low speeds is essentially the same as the high speed value.

Still another object is to provide an energizing system for variable speed synchronous motors of the above described type, which system is compact, efficient and reliable in operation, and which system eliminates the use of heavy and large circuit components and is adapted to operate from a simple unregulated D.C. supply.

A feature of the present invention is the provision of means to supply pulses of variable repetition rate and constant amplitude to a synchronous motor for speed control thereof, wherein provision is made to vary the duty cycle of the pulses in proportion to the pulse repetition rate so that substantially constant average motor current is maintained over a wide frequency range.

Another feature is the provision, in a motor speed control system of the type wherein alternating pulses of variable repetition rate are supplied to a synchronous motor, of means to vary the rest period between pulses with motor speed for more efficient power supply utilization.

A further feature of the invention is the provision of a synchronous motor speed control circuit including bistable and monostable control circuits adapted to be triggered from a common source and a pair of coincidence gates coupled to receive the outputs of the bistable and the monostable circuits. The coincidence gates are further coupled to means for supplying current pulses of alternate polarity to the motor so that when the bistable and the monostable circuits are triggered at a predetermined frequency, half wave pulses are supplied to the motor at 100 percent duty cycle. As the triggering frequency is decreased coincidence at the input of the gates varies and the duty cycle of the pulses supplied to the motor is proportionally reduced. This results in a corresponding decrease in average pulse voltage amplitude so that the average current supplied to the motor is maintained substantially constant with frequency changes.

Still another feature is the provision, in a control circuit of the above described type, of a transistor bridge circuit having a first pair of opposite corners coupled between a fixed D.C. supply and a reference potential and a second pair of opposite corners adapted to be connected across a winding of the motor. Alternate halves of the bridge supply current pulses of opposite polarity to the motor winding in response to the output of the coincidence gates so that motor drive may be achieved over a wide frequency range without the use of coupling or matching transformers.

Other attending advantages and features of the invention will become apparent from the following description when taken in conjunction with the drawings, in which:

FIG. 4 is a block diagram illustrating a further embodiment of the invention for use with a two-phase motor; and FIGS. 5a–5i are a series of waveforms illustrating the operation of the system of FIG. 4.

Figure 1:
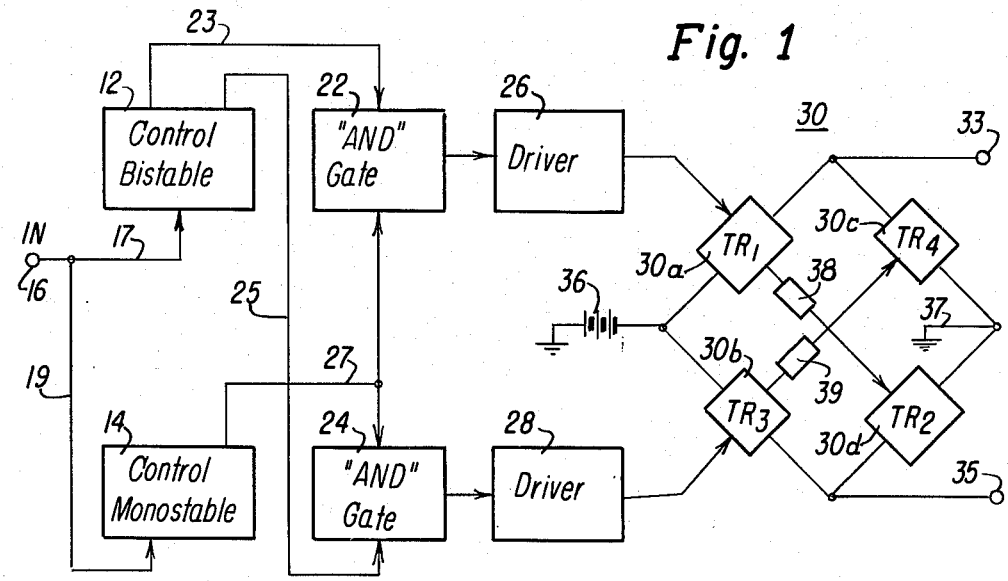
FIG. 1 is a block diagram illustrating the motor control system of the present invention.

In practicing the invention there is provided means to supply half-wave current pulses of opposite polarity to the windings of a synchronous motor. Preferably this is achieved by a transistor bridge circuit with one pair of opposite corners of the bridge connected across a winding of the motor. In instances where a single phase motor is used a capacitor may be provided to supply out-of-phase current pulses to the starting winding, while for a polyphase motor a separate bridge circuit may be used to supply out-of-phase current pulses to each motor winding. The other opposite corners of the bridge are connected across a D.C. supply and when selected transistors are switched to conduction in a controlled sequence alternate halves of the bridge circuit supplies D.C. current pulses to the associated winding, thereby providing the atlernating current pulses necessary for motor operation.

To control the repetition rate and the duty cycle of the pulses supplied to the motor, a bistable circuit and a monostable circuit are connected to supply output signals to gating circuits of the AND gate type. The bistable and monostable circuits are adapted to be triggered from a common source and the period of the monostable circuit is set to be approximately equal to one-half cycle of the highest frequency to be used for motor drive. At a corresponding triggering frequency the AND gates will be alternately enabled and disabled in a manner that switches alternate halves of the bridge circuit into conduction to supply alternate half-wave pulses of 100 percent duty cycle to the motor. As the triggering frequency is reduced the period of the bistable changes accordingly, but since the period of the monostable remains fixed, there is a reduction in the time at which there is coincidence at the inputs of the AND gates. An increase in the width of time periods between pulses supplied to the motor winding occurs so that there is a proportionate reduction in the duty cycle of pulses applied to the motor. This results in a duty cycle which varies with pulse repetition rate so that the average pulse voltage amplitude (related to 100% duty cycle) supplied to the motor winding is reduced with frequency while the instantaneous amplitude remains at the level of the fixed D.C. supply.

For a single phase motor with capacitor start control circuit means of the above described type is interposed between the common triggering source and the motor, and is triggered at a frequency which is twice the desired motor drive frequency. For a polyphase motor, as for example, a two phase motor, an additional bistable multivibrator is connected to the common triggering source, with the phase inverted outputs of the multivibrator providing triggering for a pair of control circuit means of the type described, to supply current pulses to the windings of the motor in phase quadrature. Because of frequency division, a common input trigger of a frequency four times the desired motor drive frequency is used. In either instance the average current supplied to the motor windings remains constant as inductive reactance changes with frequency.

Referring now to FIG. 1, control bistable circuit 12 and control monostable circuit 14 receive triggering pulses from a common input 16 on leads 17 and 19, respectively. Bistable circuit 12 may be a multivibrator of the known type which is adapted to be switched to alternate states of conduction in response to triggering pulses. Monostable circuit 14 may be a multivibrator of the "one-shot" type which will switch states of conduction for a predetermined period of time and then return to a quiescent state in response to a triggering pulse. Triggering pulses applied during its timing period will cause monostable circuit 14 to repeat its cycle so that it can not return to its quiescent state if triggering pulses occur before a predetermined time period.

One output of bistable circuit 12 is coupled to an input of AND gate 22 on lead 23 and the phase inverted output of bistable circuit 12 is coupled to one input of AND gate 24 on lead 25. A second input of AND gates 22 and 24 is coupled to a single output of monostable circuit 14 on lead 27. AND gates 22 and 24 are coincidence circuits of a known type and provide an output only when there is a coincidence of signals applied to both inputs.

The outputs of AND gates 22 and 24 are coupled by driver stages 26 and 28 to bridge circuit 30. Bridge circuit 30 includes transistors 30a, 30b, 30c and 30d connected with their collector-to-emitter junctions in a bridge configuration and with a pair of opposite corners adapted to be connected across a winding of a synchronous motor at terminals 33 and 35. A third corner of the bridge is connected to D.C. supply 36 while the fourth corner is connected to a reference potential such as ground at 37. Transistors 30a–30d are normally biased to cutoff and when a triggering pulse is received from either driver stage 26 or driver stage 28 the corresponding transistor 30a or 30b is rendered conductive to complete a current path between D.C. supply 36 and the respective ones of terminals 33 or 35. Biasing networks 38 and 39 are coupled between transistors 30a and 30d, and between transistors 30b and 30c, respectively, so that transistor 30d is rendered conductive concurrently with the conduction of transistor 30a while transistor 30c is rendered conductive concurrently with the conduction of transistor 30b. Accordingly, when one of terminals 33 or 35 is connected to D.C. supply 36 by either transistors 30a or 30b the opposite one of terminals 33 or 35 is connected to D.C. supply 36 by either transistors 30a or 30b the opposite one of terminals 33 or 35 is connected to ground reference potential at 37 by either transistor 30c or 30d. Thus, the current pulses flowing in opposite directions are made available for the windings of the motor in response to the outputs of AND gates 22 and 24, with such current pulses having a duty cycle which is proportional to the pulse repetition rate of triggering pulses applied to input terminal 16.

Figure 2:
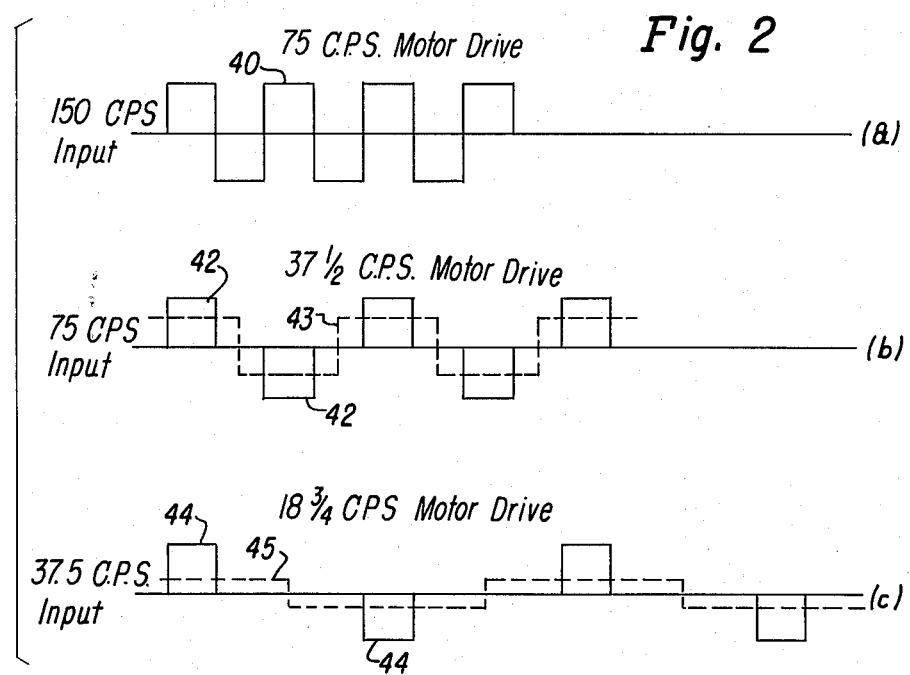
FIGS. 2a–2c are a series of waveforms useful in understanding the operation of the system of FIG. 1.

The operation of the system of FIG. 1 can be best understood with reference to the waveforms of FIGS. 2a–2c. It is to be understood that the repetition rates of the signals shown in FIGS. 2a–2c are merely illustrative and that other repetition rates variable over different ranges may be utilized in the control circuit of the invention. The period of monostable circuit 14 is set to be approximately equal to one-half cycle of a predetermined triggering rate, as for example, 150 cycles per second.

When a triggering pulse is received at terminal 16 at this predetermined repetition rate the output of monostable circuit 14 and one of the outputs of bistable circuit 12 provide coincidence at the inputs of one of AND gates 22 or 24. This AND gate is enabled and correspondingly the other AND gate is disabled, and an output is produced to be coupled by either of driver circuits 26 or 28 to energize bridge circuit 30 to produce a current pulse through the motor winding in a given direction. A second triggering pulse at this same repetition rate will change the states of bistable circuit 12 and re-trigger monostable circuit 14, which has just returned to its quiescent state. Since a phase inverted output of bistable circuit 12 is now provided the states of AND gates 22 and 24 and accordingly the direction of current flow through the motor winding is reversed. It is apparent that at this selected high triggering repetition rate the period of monostable circuit 14 allows AND gates 22 and 24 to be enabled and disabled at equal periods of time and two full half-cycle voltage pulses of equal amplitude are applied across the motor winding from supply 36 resulting in a square wave having a repetition rate of 75 cycles per second as shown by waveform 40 in FIG. 2a. Under these condtions the duty cycle is 100%.

When triggered at a lower repetition rate monostable circuit 14, having a fixed period, completes its cycles and returns to its quiescent state before the next triggering pulse is received for retriggering and to change the state of bistable circuit 12. The time which monostable circuit 14 remains in its quiescent state increases with decreased triggering repetition rate and accordingly the time of coincidence to enable each AND gate is proportionately reduced. Thus, as shown in FIG. 2b, when a 75 cycle per second input trigger is received, AND gates 22 and 24 produce outputs which energize the motor winding with pulses at a 37½ cycle per second repetition rate, as shown by waveforms 42. It is to be noted that each pulse 42 is of the same amplitude and duration as the alternate half-wave pulses making up waveform 40, but with a rest period therebetween which is proportional to the reduced triggering rate. Thus, as the triggering input is reduced from 150 cycles per second to 75 cycles per second, the duty cycle of pulses 42 is reduced to 50 percent. As shown by dotted line 43, this results in a corresponding reduction in the average voltage applied across the motor windings from source 36, with the instantaneous amplitude remaining constant.

With further reduction in the repetition rate of triggering pulses, as for example to a 37.5 cycle per second triggering rate as shown in FIG. 2c, pulses 44 are supplied to the motor winding at an 18¾ cycle per second repetition rate. It is to be noted that pulses 44 again are equal in amplitude and duration as the half-wave pulses making up waveform 40 of FIG. 2a, but with a further reduction in duty cycle. As shown by dotted line 45, the average voltage supplied to the motor has a corresponding reduction in amplitude.

It is apparent from the above that by changing duty cycle the average voltage applied to the motor from a fixed D.C. supply changes linearly with frequency. Since the impedance of the motor also changes with frequency, the average current drawn by the motor remains substantially constant over wide frequency ranges.

Figure 3:
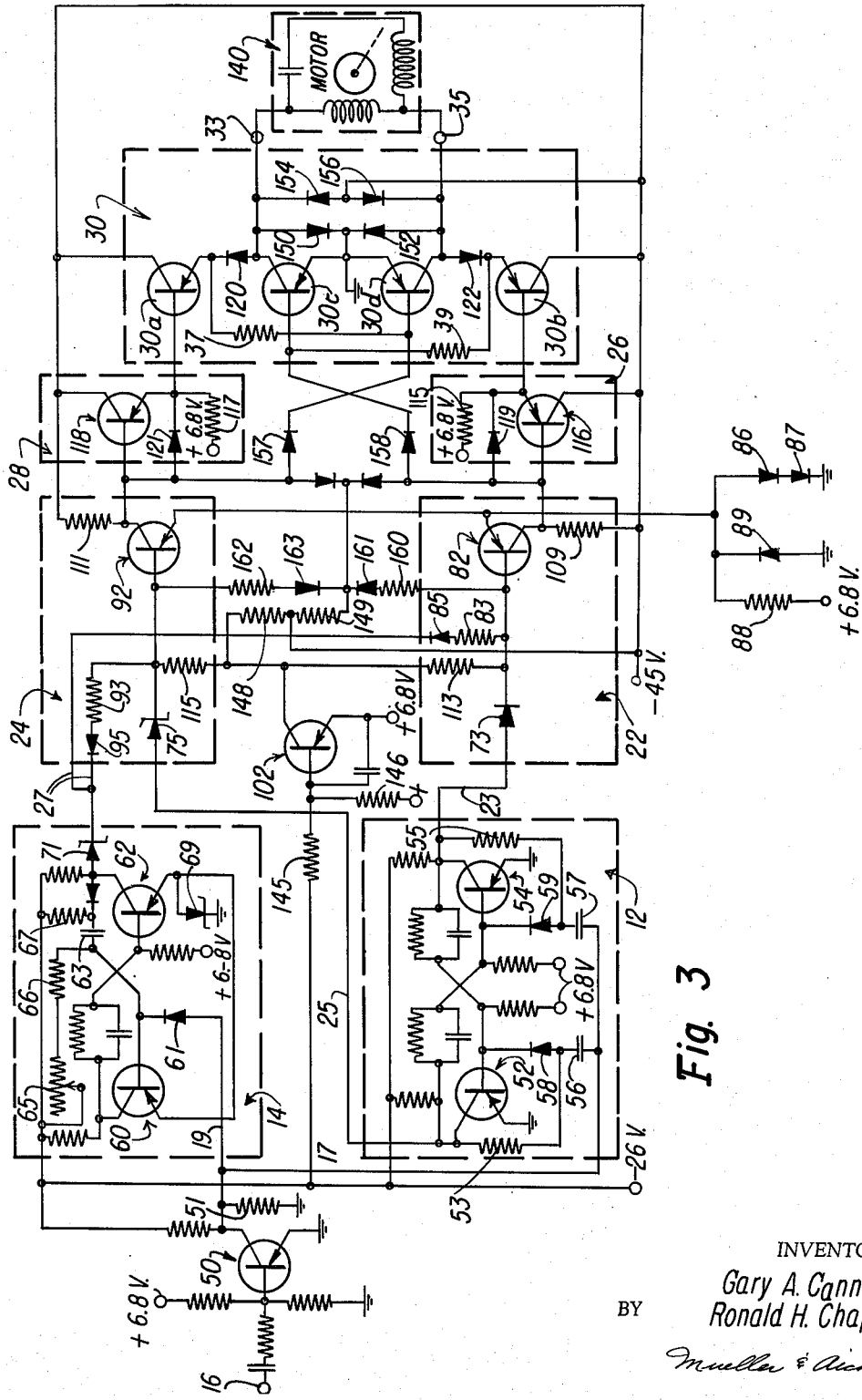
FIG. 3 is a schematic diagram of a particularly successful circuit embodiment of the invention for use with a single phase, capacitor start motor.

A particularly successful circuit embodiment of the invention for use with a single phase motor is shown in schematic form in FIG. 3. Triggering pulses applied to input terminal 16 are amplified and shaped for the triggering of bistable circuit 12 and monostable circuit 14 by an amplifier circuit including transistor 50. Bistable circuit 12 includes transistors 52 and 54 connected as a bistable multivibrator in the well-known manner. Shaped triggering pulses developed across load resistor 51, connected between the collector electrode of transistor 50 and ground reference potential, are coupled on lead 17 to the base electrode of transistors 52 and 54 by a pulse steering circuit including resistors 53 and 55, capacitors 56 and 57 and diodes 58 and 59. This pulse steering circuit allows the triggering pulses on lead 17 to change the relative conductive states of transistors 52 and 54 to provide the well-known bistable action. Signals appearing at the collector electrode of transistor 52 are supplied on lead 25 to one input of AND gate 24. Signals appearing at the collector electrode of transistor 54 are supplied on lead 23 to a corresponding input of AND gate 22.

Monostable circuit 14 includes transistors 60 and 62 connected as a "one-shot" multivibrator having only one stable state. The timing period for monostable circuit 14 is adjusted by capacitor 63 and resistors 65, 66 and 67, and as previously discussed is selected to be approximately equal to one-half cycle of the highest frequency to be used for motor drive. In practice it is desirable that this period be slightly longer than one-half cycle to just allow or even prevent reset of the monostable circuit at the highest speed and to enable some variation as to pulse width to compensate for individual motor characteristics at low speeds. It has been found, for example, that at very low speeds the magnetic characteristics of individual motors are such that some tend to saturate, resulting in an uneven drive. This may be compensated for by adjustment of variable resistor 66. Shape triggering pulses are supplied on lead 19 and coupled by diode 61 to the base electrode of transistor 60 to trigger monostable circuit 14. Zener diode 69, connected between the emitter electrodes of transistors 60 and 62 and ground reference potential, provides a fixed amount of emitter bias.

The output monostable circuit 14 is coupled by Zener diode 71 and leads 27 to one input of AND gates 22 and 24. The phase inverted outputs of bistable circuit 12, as appearing on leads 23 and 25, are coupled by Zener diodes 73 and 75 to the second input of each of AND gates 22 and 24. Zener diodes 71, 73 and 75 provide isolation of the inputs to the AND gates while at the same time allowing a wider swing of input signal to enable the AND gates from relatively low level signals.

AND gate 22 includes transistor 82 having its base electrode connected to Zener diode 73 for a first input and to Zener diode 71 by resistor 83 and diode 85 for a second input. Similarly AND gate 24 includes transistor 92 with its base electrode connected to Zener diode 75 for a first input and to Zener diode 71 by resistor 93 and diode 95 for a second input. The emitter electrodes of transistors 82 and 92 are commonly connected to a positive biasing source including forward threshold diodes 86 and 87 and resistor 88. Reversed poled diode 89 provides for overvoltage protection.

The collector electrodes of transistors 82 and 92 are connected to a negative supply by resistors 109 and 111, and their base electrodes are connected to the collector electrode of transistor 102 by resistors 113 and 114. Transistor 102 is normally maintained in a saturated condition to provide a low impedance collector-to-emitter path to a positive supply for the base electrodes of transistors 82 and 92. In the absence of coincidence of positive going signals applied to their inputs transistors 82 and 92 are maintained conducting by the negative outputs produced by the non-conducting states of multivibrators 12 and 14. The relatively positive potential appearing at the collector electrodes of transistors 82 and 92 when conducting is coupled to the input of driver stages 26 and 28 to maintain these stages cutoff.

Driver stages 26 and 28 include transistors 116 and 118 connected in the cathode follower configuration for current gain in impedance matching of driving pulses applied to bridge circuit 30. The base electrode of the transistor 116 is coupled to the collector electrode of transistor 82 and the base electrode of transistor 118 is connected to the collector electrode of transistor 92. A positive bias is applied to the emitter of transistors 116 and 118, and their base electrodes are biased by a voltage drop across resistors 109 and 111 to cutoff. Upon a change of state of either transistor 82 or 92, the respective ones of transistors 116 and 118 are rendered conductive to develop driving pulses across emitter resistors 115 and 117, respectively. Diodes 119 and 121 are connected between the base and emitter electrodes of transistors 116 and 118 for temperature and triggering stability.

Bridge circuit 30 includes transistors 30a, 30b, 30c and 30d. A pair of opposite corners for bridge circuit 30 is provided by the common connection of diode 120, in series with the emitter electrode of transistor 30a, and the collector electrode of transistor 30c to terminal 33, and by the common connection of diode 122, in series with the emitter electrode of transistor 30b, and the collector electrode of transistor 30d to terminal 35. A second pair of opposite corners of the bridge is provided by the common connection of the emitter electrodes of transistors 30c and 30d to ground reference potential and by the connection of the collector electrodes of transistors 30a and 30b to a common D.C. supply of negative potential. The base electrode of transistor 30a is connected to the emitter resistor of driver transistor 118 and the base electrode of transistor 30b is connected to the emitter resistor of driver transistor 116. The base electrode of transistor 30d is connected to the emitter electrode of transistor 30a by resistor 37 and the base electrode of transistor 30c is connected to the emitter electrode of transistor 30b by resistor 39. Thus, as transistor 30a is rendered conductive its collector voltage is reflected to the base electrode of transistor 30d to cause it to conduct, and in a like manner conduction of transistor 30b causes conduction of transistor 30c.

The corners of bridge circuit 30 coupled to terminals 33 and 35 are connected to synchronous motor 140. Motor 140 may be a single phase hysteresis synchronous motor provided with capacitor start in the known manner. Since the motor is to be energized with square wave pulses rather than a sinusoidal waveform, it should be over-rated by about 20 percent to compensate for the differences in form factor and prevent overheating.

Diodes 150 and 152 are connected between terminals 33 and 35 respectively, and ground reference potential, and are poled to shunt the collector-emitter junction of transistors 30c and 30d so that switching transients are returned to ground. Diodes 154 and 156 are connected between terminals 33 and 35 respectively, and the negative collector supply for transistors 30a and 30b, are poled to shunt the collector-emitter junction of transistors 30a and 30b to return switching transients to the negative supply. Diode 120, in series with the emitter electrode of transistor 30a and the collector electrode of transistor 30c, and diode 122, in series with the emitter electrode of transistor 30b and the collector electrode of transistor 30d, serve as blocking diodes to prevent transients produced by the highly inductive motor windings from causing reverse breakdown of the collector-emitter junctions of transistors 30a and 30b.

Diode 157 is connected between the base electrode of transistor 30d and the collector electrode of transistor 92, and diode 158 is connected between the base electrode of transistor 30c and the collector electrode of transistor 82. These diodes function as clamps to insure that transistors 30c and 30d are maintained cutoff between pulse periods at lower motor speeds.

It is to be noted from the circuit of FIG. 3 that the collector potential for bridge transistors 30a–30d, as well as AND gate transistors 82 and 92 and driver transistors 116 and 118, are derived from a common supply. Since substantial current is drawn by this supply it is desirable that it be unregulated. Conveniently this may be a −45 volt potential derived from a simple unregulated rectifier circuit. On the other hand, to insure reliable operation of bistable circuit 12 and monostable circuit 14 at low level triggering, it is preferable that the collector supply for transistors 52, 54, 60 and 62 be regulated to a moderate degree. Since this is a low current supply, series regulation may be conveniently supplied in the known manner to provide a regulated −26 volts for the early stages of the system. The relatively small positive emitter and base bias voltages may be derived from an auxiliary rectifier circuit, with stability provided by Zener and/or forward breakdown diodes.

When the system is operated from separate D.C. supplies in the manner shown, there is a possibility that AND gates 22 and 24 will be triggered by random noise pulses to cause intermittent operation of the motor when low level input stages are disabled. This may be prevented by utilizing transistor 102 as a protective switch. To this end, the −26 volt supply for multivibrators 12 and 14 is connected to the base electrode of transistor 102, and suitably divided by resistors 145 and 146, to maintain transistor 102 in a saturated condition. The unregulated −45 volt supply is connected to the junction of resistors 148 and 149 to supply collector voltage for transistor 102. Resistor 160 and diode 161, and resistor 162 and diode 163, are further connected between the base electrodes of AND gate transistors 82 and 92, and the other end of resistor 149.

As previously mentioned, with transistor 102 saturated, transistors 82 and 92 are maintained in conduction by the outputs of multivibrators 12 and 14, and are cutoff by coincidence of positive going outputs as the multivibrators are triggered. Failure of the −26 volt supply removes the negative base bias to transistor 102 to turn it off, and accordingly the large negative potential supplied to the collector electrode of transistor 102 is coupled to the base electrode of transistors 82 and 92 to maintain them conductive. This insures that in the absence of the control signals provided by monostable circuit 14 and bistable circuit 12 the transistors of bridge circuit 30 remains cutoff.

In operation, coincidence of positive going outputs of monostable circuit 14 and bistable circuit 12 (i.e., conduction of transistor 62 and of either transistor 52 or 54) causes either AND gate transistor 82 or AND gate transistor 92 to cutoff. This results in conduction of either driver transistor 116 or driver transistor 118 to develop a driving pulse across either resistor 115 or 117. Accordingly, either transistor 30a or 30b conducts, with corresponding conduction of either transistor 30c or 30d.

Conduction of transistor 30a completes a current path from the fixed D.C. supply (−45 volts) connected to its collector electrode to terminal 33 and to motor 140. Concurrently conduction of transistor 30d completes a current path from terminal 35 to ground reference potential. Thus, a pulse of current is supplied from a fixed supply to motor 140 and to ground in a given direction. When transistor 30b, and concurrently transistor 30c, conducts, a similar pulse of current is supplied to motor 140 but in an opposite direction. Accordingly, square wave pulses of opposite polarity are provided to operate motor 140 at a speed which is determined by the repetition rate of these pulses. Because of the gating action of AND gates 22 and 24, transitsors 30a and 30b are made to conduct alternately and because of the manner in which the input to AND gates 22 and 24 are controlled by bistable circuit 12 and monostable circuit 14, there is a proportional reduction of duty cycle of the current pulses supplied to motor 140 as the repetition rate thereof is reduced.

For use with polyphase motors such as two phase synchronous motors, the control system of the invention may be modified as shown in FIG. 4. This eliminates the frequency sensitive phase shifting capacitor necessary for providing the starting torque of a single phase motor and results in improved operation at lower motor speeds, particularly with regards to starting torque.

Multivibrator circuit 200 is of the conventional bistable type and is adapted to be triggered by triggering pulses supplied to input trigger terminal 16. The phase inverted output signals of multivibrator 200 are coupled to motor drive circuits 214 and 216 on leads 210 and 212, respectively. When a transistor multivibrator is used, it is to be understood that the phase inverted output signals appearing on leads 210 and 212 may be derived at the collector electrode of the transistors making up multivibrator 200. Each of motor control circuits 214 and 216 are identical and in circuit detail may be equivalent to the motor control circuit illustrated in FIG. 3. The output of motor drive circuit 214 is connected between terminals 233 and 235 to supply current pulses to a given phase to one winding of two-phase synchronous motor 240. The output of motor control circuit 216 is similarly connected between terminals 233a and 235a to supply current pulses phase shifted 90° to a second winding of motor 240.

With reference to the waveforms of FIGS. 5a through 5i, triggering pulses 250 coupled to bistable multivibrator 200 from input trigger terminal 16 produce square wave outputs 252a and 252b of FIGS. 5b and 5c on leads 210 and 212 respectively. It is to be noted that square waves 252a and 252b are 180° out-of-phase with one another. These square waves are coupled as a common input trigger to the control bistable and control monostable circuits which are included in respective ones of motor drive circuits 214 and 216. The control bistable and control monostable circuits in turn function in the same manner as bistable circuit 12 and monostable circuit 14 of FIGS. 1 and 3 to provide coincidence gating of the AND gates also included in motor drive circuits 212 and 214. With properly poled diodes coupling leads 210 and 212 to the monostable and bistable circuits of the motor drive circuits, triggering is provided by positive going leading edges of square wave 252a and 252b. As a result, motor control circuit 215 receives triggering pulses 254a, spaced as shown in FIG. 5d, and motor control circuit 216 receives triggering pulses 254b spaced, as shown in FIG. 5e.

Accordingly, motor control circuit 214 supplies voltage pulses 256a of FIG. 5e to one winding of motor 240, and motor control circuit 216 supplies the voltage pulses 256b to the other winding of motor 240, both at some predetermined triggering rate to provide 100 percent duty cycle. It is to be understood that current pulses 256a and 256b are supplied to respective motor windings by bridge circuit 30 of FIGS. 1 and 3, also included in motor drive circuits 214 and 216. Because of the time spacing of triggering pulses 254a and 254b (FIGS. 5d and 5e), pulses 256a and 256b are 90° out-of-phase with each other to provide the necessary phase relationship for operation of a two-phase synchronous motor. When the repetition rate of triggering pulses supplied to terminal 16 is reduced, the necessary 90° phase relationship remains, but the duty cycle of the voltage pulses supplied to each motor winding is proportionally reduced in the manner previously discussed, as shown by the waveforms 258a and 258b of FIGS. 5h and 5i. And as previously discussed, the average voltage supplied to each motor winding, as shown by dotted lines 259a and 259b of FIG. 5i, is correspondingly reduced in amplitude so that average current supplied to the motor from a fixed D.C. supply remains essentially constant with the frequency change. At the same time 90° phase shift required for two phase motor operation is retained between the average or effective voltage supplied to each motor winding.

Because the frequency dividing action of bistable multivibrator 200 it is necessary that the trigger frequency supplied to common input terminal 16 be twice that used for a single phase motor for the same motor speed. Since the two motor windings are isolated with respect to D.C., a common D.C. supply, unregulated as to motor current and with some degree of regulation for the low level stages of the motor drive circuits 214 and 216 as discussed in conjunction with FIG. 3, may be used for the overall two-phase system.

The invention provides, therefore, a control system for a synchronous motor drive by which motor speed can be changed linearly with changes in repetition rate of triggering pulses over a wide frequency range. By providing a duty cycle for the energization pulses which varies with repetition rate the motor may be driven from a fixed unregulated D.C. supply without large power waste or the use of complicated circuitry to vary voltage amplitude with pulse repetition rate. The use of a bridge configuration to supply energization pulses to the motor eliminates the need for a large and heavy transformer which would be necessary for operation over a range of low frequencies. All the circuits of the system may be readily transistorized to provide a compact and self-contained unit which is readily adaptable for portable and mobile operation. With the system described it is possible to vary motor speed by at least an 8 to 1 ratio to provide constant torque while operating from a fixed, unregulated D.C. supply. The system may be used with a single phase capacitor start motor, or with polyphase motors such as two-phase synchronous motors.

We claim:

1. A motor speed control system including in combination, means including bridge circuit means for providing variable repetition frequency voltage pulses of a fixed amplitude and alternately opposite polarity, means for coupling said pulses to a synchronous motor, with the speed of said motor variable with pulse repetition frequency, and control circuit means coupled to said bridge circuit means, said control circuit means including first and second coincidence gates, a monostable circuit, and a bistable circuit, means coupling the output of said monostable circuit to a first input of each said coincidence gate, means coupling first and second phase inverted outputs of said bistable circuit to a second input of said first and second coincidence gates respectively, and means applying recurring triggering signals simultaneously to said monostable circuit and to said bistable circuit, so that said coincidence gates control said bridge circuit to provide energizing pulses to the motor and the duty cycle of said pulses varies with repetition frequency to provide a substantially constant average current to said motor over a range of repetition frequencies.

2. A motor speed control circuit including in combination, a plurality of semiconductor switching devices connected in a bridge circuit, means connecting one pair of opposite corners of said bridge circuit across a fixed D.C. potential, means connecting the other pair of opposite corners of said bridge circuit to a synchronous motor for supplying current pulses of alternately opposite polarity in response to control pulses supplied to said switching devices, an input triggering terminal, and control circuit means including bistable circuit means and monostable circuit means coupled to said input triggering terminal and actuated by triggering pulses applied thereto, said control circuit including means applying control pulses to said switching devices in response to operation of said bistable circuit means and said monostable circuit means to provide constant duration current pulses having a duty cycle which varies in proportion to the repetition rate of triggering pulses applied to said input triggering terminal, whereby substantially constant average current is supplied to said motor over a range of motor speeds.

3. A motor speed control circuit including in combination, switching circuit means having input control terminals and output terminals for supplying current pulses of alternately opposite polarity to a synchronous motor from a fixed potential supply, driving circuit means coupled to said input terminals to activate said switching circuit means in response to control pulses applied thereto, an input triggering terminal, bistable circuit means and monostable circuit means each having an input connected to said input triggering terminal, said bistable circuit means providing first and second output signals in response to a triggering signal applied to said triggering terminal, and said monostable circuit means having a period of substantially one-half cycle of a predetermined repetition rate to provide an output signal of a fixed duration, first and second coincidence circuit means, means coupling a first input of said first and second coincidence circuit means to the fixed duration output of said monostable circuit means, means coupling a second input of one said coincidence circuit means to a first output of said bistable circuit means, means coupling a second input of the other said coincidence circuit means to the second output of said bistable circuit means, and means coupling the output of said coincidence circuit means to said driving circuit means, whereby said switching circuit means is activated at 100 percent duty cycle at said predetermined triggering repetition rate and at a proportionately reduced duty cycle at a decreased triggering repetition rate.

4. Apparatus for speed control of a synchronous motor including in combination, bistable circuit means having an input terminal and first and second output terminals, monostable circuit means having an input terminal and an output terminal, a trigger input terminal, means coupling the input terminals of said bistable and said monostable circuit means to said trigger input terminal, with said bistable circuit means providing phase inverted output signals at a repetition rate determined by triggering signals applied to said trigger input terminal and said monostable circuit means having a fixed period to provide an output signal of a duration substantially equal to one-half cycle of a predetermined repetition rate, control circuit means including first and second gating circuits each having first and second input terminals and an output terminal, means coupling the output terminals of said monostable circuit means and said bistable circuit means to the input terminals of said gating circuits, and means responsive to the outputs of said gating circuits for supplying current pulses of alternate polarity to the windings of a synchronous motor, with said pulses varying in duty cycle in proportion to the repetition rate of triggering pulses applied to said trigger input terminal to thereby provide substantially constant average motor current over a range of motor speeds.

5. Apparatus for speed control of a synchronous motor including in combination, bistable circuit means having an input terminal and first and second output terminals, a monostable circuit means having an input terminal and an output terminal, a trigger input terminal, means coupling the input terminals of said bistable circuit means and said monostable circuit means to said trigger input terminal, with said bistable circuit means providing phase inverted output signals as the repetition rate determined by a triggering signal supplied to said trigger input terminal and said monostable circuit means having a fixed period to provide an output signal of a duration substantially equal to one-half cycle of a predetermined triggering repetition rate, first and second AND gates each having first and second input terminals and an output terminal, means coupling the output terminal of said monostable circuit means to one input terminal of each said AND gates, means coupling a first output terminal of said bistable circuit means to the other input terminal of one said AND gate and a second output terminal of said bistable circuit means to the other input terminal of the other said AND gate, current conduction controlling means having first and second control terminals and output terminals for supplying current pulses of alternately opposite polarity to a synchronous motor from a fixed potential voltage source, means coupling the output terminal of one said AND gate to one input terminal of said current conduction controlling means, and means coupling the output terminal of the other said AND gate to the other input terminal of said current conduction controlling means, whereby current pulses of opposite polarity are supplied at 100 percent duty cycle at said predetermined triggering repetition rate and at a proportionately reduced duty cycle at decreased triggering repetition rate.

6. Apparatus for speed control of a synchronous motor including in combination, bistable circuit means having an input terminal and first and second output terminals, monostable circuit means having an input terminal and an output terminal, a trigger input terminal, means coupling the input terminals of said bistable circuit means and said monostable circuit means to said trigger input terminal, with said bistable circuit means providing first and second signals at the repetition rate determined by a triggering signal supplied to said trigger input terminal and said monostable circuit means having a fixed period to provide an output signal of a duration substantially equal to one-half cycle of a predetermined trigger repetition rate, first and second AND gates each having first and second input terminals and an output terminal, means coupling the output of said monostable circuit means to one input of each said AND gates, means connecting a first output terminal of said bistable circuit means to the other input terminal of one said AND gate and a second output terminal of said bistable circuit means to the other input terminal of the other said AND gate, a plurality of semiconductor devices connected in a bridge circuit, means for connecting one pair of opposite corners of said bridge circuit to a synchronous motor, means for coupling the other pair of opposite corners of said bridge circuit across a D.C. potential source, and means coupled between the outputs of said AND gates and said bridge circuit to produce conduction in opposite pairs of arms of said bridge circuit in response to coincidence of signals applied to the inputs of said AND gates, whereby current pulses of alternately opposite polarity are provided for said synchronous motor, with said pulses having a duty cycle proportional to the repetition rate of the triggering signal supplied to said trigger input terminal to provide substantially constant average current for said motor over a range of input triggering repetition rates.

7. Circuit means for supplying pulses having a duty cycle that varies in proportion to repetition rate including in combination, bistable circuit means having an input terminal and first and second output terminals, monostable circuit means having an input terminal and an output terminal, with the output terminal of said monostable circuit means providing a signal in response to its astable state, means for coupling the input terminals of said bistable circuit means and said monostable circuit means to a common input trigger terminal, first and second coincidence gating circuits each having first and second inputs and an output, said gating circuits assuming one of two conductive states in response to coincidence of signals applied to the input terminals thereof, means coupling the output terminal of said monstable circuit means to the first input of each said gating circuit means, means coupling one output of said bistable circuit means to the second input of one said gating circuit means, means coupling the other output of said bistable circuit means to the second input of the other said gating means, and means coupled to the outputs of said gating circuits to provide pulses in response to one of the states of said gating circuits, whereby said pulses are supplied at 100 percent duty cycle at a predetermined trigger repetition rate and at a proportionately reduced duty cycle at decreased trigger repetition rate.

8. Circuit means for supplying pulses having a duty cycle that varies in proportion to repetition rate including in combination, bistable circuit means having an input terminal and first and second output terminals, monostable circuit means having an input terminal and an output terminal, with the output terminal of said monostable circuit means providing a signal in response to its astable state, means for coupling the input terminal of said bistable circuit means and said monostable circuit means to a common input trigger terminal, first and second AND gates each having first and second inputs and an output, with said AND gates assuming one of two conductive states in response to coincidence of signals applied to the input terminals thereof, means coupling the output terminal of said monostable circuit means to the first input of each said AND gate, means coupling one output of said bistable circuit means to the second input of one said AND gate, means coupling the other output of said bistable circuit means to the second input of the other said AND gate, semiconductor devices having input, output and control electrodes connected in a bridge circuit, with a first pair of opposite corners of said bridge circuit connected across a D.C. potential source and with a second pair of opposite corners of said bridge circuit adapted to be connected to pulse utilization means, and means coupling the outputs of said AND gates to the control electrodes of said semiconductor devices to render opposite one conductive as said AND gates assume a given conduction state, whereby pulses are supplied at 100 percent duty cycle at a predetermined trigger repetition rate and at a proportionately reduced duty cycle at decreased trigger repetition rate.

9. A motor speed control system including in combination, means for producing a first series of variable repetition frequency voltage pulses of a fixed amplitude and alternately opposite polarity, means for producing a second series of variable repetition frequency voltage pulses of a fixed amplitude and alternately opposite polarity, said second series of pulses in phase quadrature with said first series of pulses, means for coupling said first series of pulses to a first winding of a synchronous motor, means for coupling said second series of pulses to a second winding of a synchronous motor, and means coupled to each said pulse producing means to vary the duty cycle of said first and second series of pulses and to maintain said phase quadrature relationship therebetween with varying repetition frequency, thereby providing substantially constant average current for each said motor winding in phase quadrature relationship as the repetition frequency of said pulses varies.

10. A motor speed control system including in combination, first bridge circuit means for providing a first series of variable repetition frequency voltage pulses of a fixed amplitude and alternately opposite polarity; second bridge circuit means for providing a second series of variable repetition frequency voltage pulses of a fixed amplitude and of alternately opposite polarity, said second series of voltage pulses in phase quadrature with said first series of voltage pulses; means for coupling said first series of voltage pulses to a first winding of a two phase synchronous motor; means for coupling said second series of voltage pulses to a second winding of said synchronous motor; first control circuit means coupled to said first bridge circuit means; second control circuit means coupled to second said bridge circuit means; each said control circuit means including first and second coincidence gates, a monostable circuit and a bistable circuit, with the output of said monostable circuit coupled to a first input of each said coincidence gate and the phase inverted outputs of said bistable circuit coupled to a second input of individual ones of said coincidence gates; and means for coupling said monostable circuits and said bistable circuits to a source of triggering signals, so that the duty cycle of said pulses varies with repetition frequency to provide substantially constant average current in respective windings of said motor over a range of repetition frequencies.

11. Apparatus for speed control of a synchronous motor including in combination, triggering bistable circuit means having an input terminal and first and second output terminals, first and second control bistable circuits each having an input terminal and first and second output terminals, first and second control monostable circuits each having an input terminal and an output terminal, a trigger input terminal, means for coupling the input terminal of said triggering bistable circuit means to said trigger input terminal, said triggering bistable circuit means providing phase inverted output signals of a repetition rate determined by triggering signals applied to said trigger input terminal, means coupling the first output terminal of said triggering bistable circuit means to the input terminals of said first control bistable circuit and said first control monostable circuit, means coupling the second output terminal of said triggering bistable circuit means to the input terminals of said second control bistable circuit and said second control monostable circuit, each said control bistable circuit providing phase inverted output signals at a repetition rate determined by the output of said triggering bistable circuit means and each said monostable circuit means providing an output signal in response to its astable state, first and second circuit means each including first and second gating circuits, with each gating circuit having first and second input terminals and an output terminal, means coupling the output terminals of said first control bistable circuit and said first control monostable circuit to the input terminals of the gating circuits of said first circuit means, means coupling the output terminals of said second control bistable and said second control monostable circuit to the input terminals of the gating circuit of said second circuit means, means responsive to the output of the gating circuits of said first circuit means for supplying pulses of alternate polarity to a first winding of a synchronous motor, means responsive to the outputs of the gating circuits of said second circuit means for supplying pulses of alternate polarity to a second winding of a synchronous motor, said pulses being in phase quadrature relationship with said pulses varying in duty cycle in proportion to the repetition rate of triggering pulses applied to said trigger input terminal to thereby provide substantially constant average current to respective winding of said motor over a range of motor speeds.

12. A control system for energizing an alernating current energized device including in combination, first and second switch means for respectively applying voltages of fixed amplitude and of opposite polarities to the device, first and second control means coupled to said first and second switch means for controlling the operation thereof, and means coupled to said first and second control means to cause synchronous operation thereof, said first control means conditioning said first and second switch means to conduct to transmit pulses during periods of a given duration, said second control means causing said first and second switch means to alternately conduct during said conditioned periods, and controlling the period between initiation of conduction of one of said switch means and initiation of conduction of the other one of said switch means, to thereby control the repetition rate of said pulses of given duration and fixed amplitude which are applied to the device.

13. An energizing system for an alternating current energized device which provides energizing pulses alternately of opposite polarities to the device having a repetition rate related to the repetition rate of a triggering signal, said system including in combination, first and second switch means for respectively applying voltages of fixed amplitude and of opposite polarities to the device, first and second control means coupled to said first and second switch means for controlling operation thereof, said first control means conditioning said first and second switch means to conduct to produce voltage pulses during periods of a given duration, said second control means controlling the operation of said first and second switch means during said periods and causing said first, said second control means causing operation of said first and second switch means for second switch means to alternately conduct and controlling the repetition rate of said voltage pulses produced thereby, and means responsive to the triggering signal for actuating said first and second control means to thereby control the repetition rate of said voltage pulses applied to the device, with the average voltage amplitude of such pulses decreasing with the repetition rate thereof.

14. A motor control system for energizing a synchronous motor and for operating the same at a speed related to the repetition rate of a triggering signal, said system including in combination, means for supplying a direct current voltage of a fixed value, first and second switch means for respectively connecting said voltage supplying means to the motor to apply said direct current voltage thereto with opposite polarities, first and second control means coupled to said first and second switch means for controlling the operation thereof, said first control means conditioning said first and second switch means to conduct for periods of a given time duration to transmit voltage pulses, said second control means causing said first and second switch means to alternately conduct during said conditioned periods and controlling the initiation of each voltage pulses transmitted thereby, and means responsive to the triggering signal for actuating said first and second control means to thereby control the repetition rate of said voltage pulses applied to the motor.

References Cited by the Examiner

UNITED STATES PATENTS 2,713,657  7/1955  Toulon _____ 318—231
2,932,778  4/1960  Curtis _____ 318—314

(Other references on following page)

UNITED STATES PATENTS

| | | | |
|---|---|---|---|
| 2,959,725 | 10/1960 | Younkin | 321—45 X |
| 2,972,710 | 2/1961 | D'Amico | 321—45 |
| 2,977,518 | 3/1961 | Kafka | 318—138 |
| 3,105,944 | 10/1963 | Lostetter | 321—45 |
| 3,109,977 | 11/1963 | Redfern | 321—44 |
| 3,117,268 | 1/1964 | Madsen | 318—341 |
| 3,124,732 | 3/1964 | Dupy | 318—138 |
| 3,168,657 | 2/1965 | Wells | 307—88.5 |

ORIS L. RADER, *Primary Examiner.*

MILTON O. HIRSHFIELD, *Examiner.*

J. C. BERENZWEIG, C. E. ROHRER,
*Assistant Examiners.*